J. BATH.
RING GAUGE.
APPLICATION FILED MAR. 31, 1920.

1,438,681. Patented Dec. 12, 1922.

Inventor
John Bath
By Attorneys
Southgate + Southgate

Witness
C. F. Mason

Patented Dec. 12, 1922.

1,438,681

UNITED STATES PATENT OFFICE.

JOHN BATH, OF WORCESTER, MASSACHUSETTS, ASSIGNOR TO JOHN BATH & CO., INC., OF WORCESTER, MASSACHUSETTS, A CORPORATION OF MASSACHUSETTS.

RING GAUGE.

Application filed March 31, 1920. Serial No. 370,093.

*To all whom it may concern:*

Be it known that I, JOHN BATH, a citizen of the United States, residing at Worcester, in the county of Worcester and State of Massachusetts, have invented a new and useful Ring Gauge, of which the following is a specification.

This invention relates to a ring gauge of the type commonly used for accurately testing external cylindrical sizes. Such ring gauges are commonly formed as a single block of hardened metal, ground to accurate internal diameter.

It is the object of my invention to improve the construction of such gauges by providing a plurality of axial openings about the periphery thereof and between the inner and outer walls. Preferably these openings are uniformly spaced from each other and are also spaced at substantially similar distances from the inner and outer walls of the gauge.

A preferred form of my invention is shown in the drawings, in which—

Figure 1:
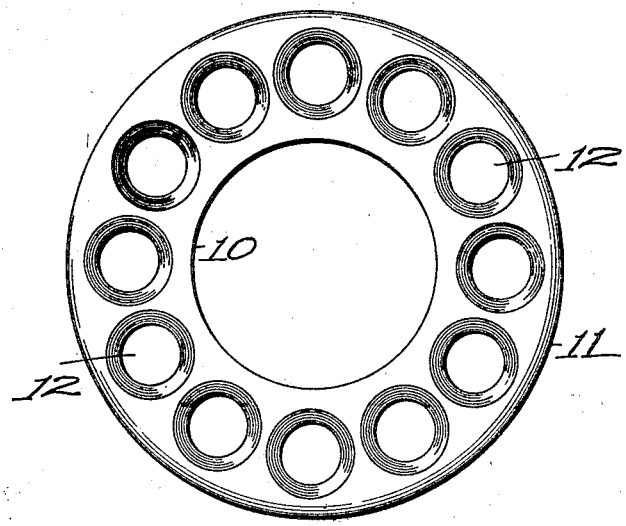
Fig. 1 is a plan view of my improved gauge.
Figure 2:
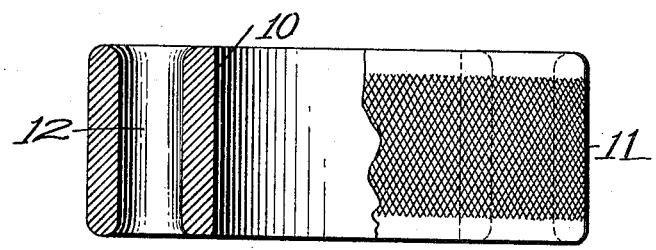
Fig. 2 is an elevation thereof, partly in section.

Referring to the drawings, I have shown a ring gauge, having a cylindrical inner wall 10, a cylindrical outer wall 11, and a plurality of axial openings 12 extending through the gauge. These openings 12 are spaced around the gauge and are preferably at substantially uniform distances from each other. It is also desirable that the openings 12 should be separated by substantially the same distances from the inner wall 10 and the outer wall 11, so that the stock remaining on all sides of the openings 12 may be of substantially the same thickness. The outer ends of each opening 12 are preferably rounded over, as shown in Fig. 2, to obtain advantages to be described.

I find that a gauge constructed as described may be hardened with much less distortion than the usual solid gauge and that when once ground to exact size, it is less subject to temperature variations, particularly to those caused by holding the gauge in the hands. The heat of the hand does not pass readily through the webbed construction between the inner and outer walls. The rounding of the ends of the holes 12 avoids sharp edges which may cause difficulty in hardening and also strengthens the webbed construction and improves the appearance of the gauge.

The new gauge is materially lighter than the usual solid gauge of the same size. The inner portion of the gauge may be hardened while the outer portion remains unchanged, if such construction is found desirable. Furthermore, it is found possible to draw and harden the inner portion of a worn gauge of this new type in such a way as to shrink the gauge and permit it to be reground, thus adding greatly to the useful life of the gauge.

Having thus described my invention, it will be evident that changes and modifications can be made therein by those skilled in the art within the spirit and scope thereof as set forth in the claims, and I do not wish to be otherwise limited to the details herein disclosed, but

What I claim is:—

1. A ring gauge formed of a single body of metal having a cylindrical gauging opening centrally disposed therein and having a side wall of substantial thickness with a plurality of axially extending circumferentially spaced openings therein, said latter openings being entirely separated from said gauging opening by the intervening solid wall portion.

2. A ring gauge formed of a single body of metal with cylindrical inner and outer walls and having a plurality of openings extending axially through the metal between said walls, said openings being spaced apart and entirely separated from said inner and outer walls by the intervening solid wall portion, and having rounded outer edges at both ends of said openings.

3. A ring gauge comprising a single block of metal having an outer wall and a cylindrical inner wall, and having axial openings between said walls spaced at substantially equal distances from each other and from the inner and outer walls, said openings being entirely separated from said inner and outer walls by the intervening solid wall portion.

In testimony whereof I have hereunto affixed my signature.

JOHN BATH.